United States Patent [19]

Newcomb et al.

[11] Patent Number: 5,277,891
[45] Date of Patent: Jan. 11, 1994

[54] METHOD OF PRODUCING PURE HOT HYDROGEN

[75] Inventors: John C. Newcomb, Simi Valley; David Stelman, West Hills, both of Calif.

[73] Assignee: Rockwell International Corporation, Seal Beach, Calif.

[21] Appl. No.: 839,156

[22] Filed: Feb. 21, 1992

[51] Int. Cl.$^5$ .............................................. C01D 15/02
[52] U.S. Cl. ...................................... 423/641; 48/61; 422/187
[58] Field of Search ......................................... 423/641

[56] References Cited

U.S. PATENT DOCUMENTS 2,706,890  4/1955  Schmidt ............................. 423/641
2,825,629  3/1958  Schumacher et al. ............. 423/641
3,459,493  8/1969  Ross ................................... 423/641

FOREIGN PATENT DOCUMENTS 21214   6/1972  Japan ................................. 423/641
505734  5/1939  United Kingdom ............... 423/641

Primary Examiner—Wayne Langel
Attorney, Agent, or Firm—H. Fredrick Hamann; Harry B. Field; David C. Faulkner

[57] ABSTRACT

A dilution cooled lithium reactor for producing hot hydrogen which in turn drives a power-generating device such as a turbine is disclosed. Within the reactor are injected heat-generating reactants such as liquid lithium and liquid oxygen. The reactants combine to heat hydrogen which in turn is filtered and delivered to a power-generating device such as a turbine.

6 Claims, 1 Drawing Sheet

METHOD OF PRODUCING PURE HOT HYDROGEN

BACKGROUND OF THE INVENTION

With the advent of a space station with long-term human occupation as well as prospective extended duration spacecraft missions, the need for a simple and reliable yet powerful source of energy for consumption by a space station or spacecraft has been recognized.

Current energy sources employed to power existing space vehicles of the aforementioned variety include solar-powered apparatus as well as nuclear energy devices, all of which may be inherently hampered by insufficient energy production or dangers associated with radiation generated by the nuclear reactor assembly.

Accordingly, it would be desirable to have available a device or apparatus for generating a clean reaction product which would find utility in powering a generating device, which device could provide necessary power in a space vehicle.

It is an object of the present invention to generate hot hydrogen to run a power-generating device of basic construction and reliability.

Another object of the present invention is a method of generating hot hydrogen in a reactor vessel utilizing a safe and efficient chemical reaction.

Additional objects, advantages and novel features of the invention will be set forth in the description which follows.

SUMMARY OF THE INVENTION

To achieve the foregoing and other objects, and in accordance with the purposes of the present invention, an apparatus for generating hot hydrogen and a method for utilizing hot hydrogen to operate a power generator is provided. The apparatus of the present invention comprises a reactor into which is introduced heat-producing reactants. Under controlled reaction parameters, the heat-producing reactants undergo a chemical reaction resulting in the production of reaction byproducts and hot hydrogen.

Associated with the reactor is a filter to which the reaction byproducts, including hydrogen, are charged. In the filter, hydrogen is separated and released to a power-generating device such as a turbine.

BRIEF DESCRIPTION OF THE DRAWING

FIG. 1 is a schematic representation of an apparatus of the present invention for producing hot hydrogen to power a turbine or the like.

DETAILED DESCRIPTION OF THE INVENTION

Figure 1:
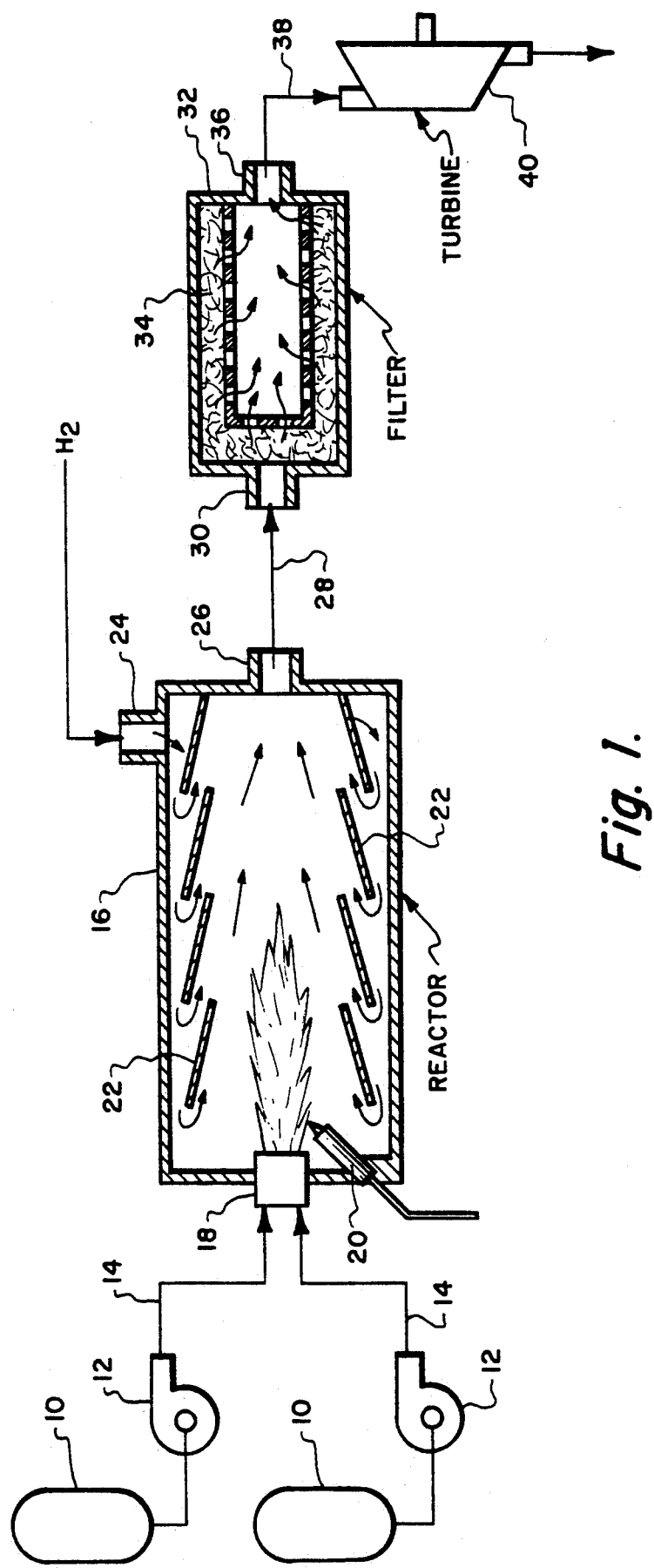

As shown in the figure, storage containers 10 associated with pumps 12 are provided for holding hydrogen-producing reactants. In the instant invention, one of the storage containers will house liquid lithium and liquid oxygen will be stored in the other.

As shown, conduits 14 associated with the pumps and storage containers lead to reactor 16. An injector device 18 is positioned within a wall at one end of the reactor. Positioned adjacent injector 18 is an ignitor 20 for igniting the reactants as they are introduced into the reactor by the injector.

About the circumference of the reactor, baffles 22 are positioned along the interior walls of the reactor. This will allow for cooling of the reactor during the interaction of the lithium and oxygen by the introduction of liquid hydrogen at opening 24. As liquid hydrogen enters the reactor via opening 24, the baffles 22 serve to circulate the hydrogen about the interior walls of the reactor to maintain the reactor temperature at about 1500° F. while simultaneously heating the hydrogen to about 1,500° F.

Opposite the injector 18 in the wall of the reactor is an exit 26 for removing the chemical reaction byproducts. These chemical reaction byproducts, lithium oxide, and heat, are conveyed by a line or conduit 28 to the filter intake 30 of fume filter 32. A filter element 34 housed within the filter serves to separate the byproducts, retaining lithium oxide and releasing hot hydrogen through filter exit 36 for conveyance along conduit 38 to a power generating device 40 which in this case is shown to be a gas turbine.

In operation, pure hot hydrogen is produced for utilization by the turbine by controllably introducing liquid lithium and liquid oxygen reactants from the storage containers 10 into reactor 16. Within the reactor 16 the reactants are merged by mixing them via injector 18.

At start up, the reactants are exposed to an ignitor, which starts the reaction initially. The ignitor may be a spark plug, a laser beam, a gas flame, a pyrogolic substance, or other types of ignitors. The reaction of lithium and oxygen liberates heat raising the temperature of the central portion of the reactor to about 6000° F. After start up, the reaction is self-sustaining without the ignitor.

During the course of the reaction within the reactor, the walls are maintained at a desired temperature level as previously indicated by the introduction of hydrogen from an external source (not shown) through opening or inlet 24.

The reaction products, of lithium oxide, and hot hydrogen are then expelled from the reactor and enter the filter, which filter system retains the lithium oxide and releases the hot hydrogen byproduct. The hydrogen is then transported to the turbine for the production of power for the space vehicle.

The foregoing description of the invention has been presented for purposes of illustration and description. It is intended that the scope of the invention be defined by the claims appended hereto.

What is claimed is:

1. A method of producing pure hot hydrogen comprising:
   a) introducing liquid lithium and liquid oxygen reactants into a reactor;
   b) merging the reactants within the reactor by mixing the reactants in an injector;
   c) causing the reactants to undergo a chemical reaction to produce lithium oxide and heat;
   d) introducing liquid hydrogen to cool the reactor walls and absorb heat, thereby producing hot pure hydrogen; and
   e) separating the byproducts.

2. The method of claim 1 in which the reactants are exposed to high temperature within the reactor and undergo said chemical reaction to produce the lithium oxide and heat which raises the hydrogen temperature to 1,500° F.

3. The method of claim 1 in which the byproducts are separated by removal from the reactor to a fume filter which captures lithium oxide, and simultaneously removing hydrogen from the filter and recovering same.

4. The method of claim 1 in which the reactor is cooled by the introduction of hydrogen from an external source.

5. The method of claim 2 in which the reactants are exposed to a temperature of about 6000° F.

6. The method of claim 2 in which the high temperature is produced by a gas flame occasioned within the reactor.

* * * * *